US009053481B2

(12) United States Patent
Parento et al.

(10) Patent No.: US 9,053,481 B2
(45) Date of Patent: Jun. 9, 2015

(54) METHODS AND SYSTEMS FOR PROVIDING A PAYMENT ACCOUNT WITH ADAPTIVE INTERCHANGE

(71) Applicants: Stephen A. Parento, White Plains, NY (US); Ron Hynes, Ridgefield, CT (US)

(72) Inventors: Stephen A. Parento, White Plains, NY (US); Ron Hynes, Ridgefield, CT (US)

(73) Assignee: MasterCard International Incorporated, Purchase, NY (US)

( * ) Notice: Subject to any disclaimer, the term of this patent is extended or adjusted under 35 U.S.C. 154(b) by 57 days.

(21) Appl. No.: 13/721,922

(22) Filed: Dec. 20, 2012

(65) Prior Publication Data

US 2013/0166402 A1     Jun. 27, 2013

Related U.S. Application Data

(60) Provisional application No. 61/578,438, filed on Dec. 21, 2011, provisional application No. 61/727,979, filed on Nov. 19, 2012.

(51) Int. Cl.
*G06G 1/12* (2006.01)
*G06Q 20/00* (2012.01)
*G06Q 20/40* (2012.01)
*G06Q 20/20* (2012.01)
*G06Q 20/32* (2012.01)

(52) U.S. Cl.
CPC .............. *G06Q 20/40* (2013.01); *G06Q 20/20* (2013.01); *G06Q 20/3223* (2013.01)

(58) Field of Classification Search
None
See application file for complete search history.

(56) References Cited

U.S. PATENT DOCUMENTS

| 7,379,919 | B2 | 5/2008 | Hogan et al. |
| 7,650,314 | B1 | 1/2010 | Saunders |
| 2002/0007320 | A1 | 1/2002 | Hogan et al. |
| 2008/0065554 | A1 | 3/2008 | Hogan et al. |
| 2008/0071625 | A1 | 3/2008 | Arumugam |
| 2008/0179395 | A1 | 7/2008 | Dixon et al. |
| 2008/0270275 | A1 | 10/2008 | McElroy et al. |
| 2009/0299841 | A1* | 12/2009 | Bishop et al. .............. 705/14.21 |
| 2010/0223186 | A1 | 9/2010 | Hogan et al. |

OTHER PUBLICATIONS

International Searching Authority, "PCT International Search Report and the Written Opinion", dated Mar. 3, 2013, for International Application No. PCT/US12/70918, 9pgs.

* cited by examiner

*Primary Examiner* — Paul Danneman
(74) *Attorney, Agent, or Firm* — Buckley, Maschoff & Talwalkar LLC

(57) ABSTRACT

Pursuant to some embodiments, systems, methods, apparatus, and means for conducting payment transactions using mobile devices are provided in which a mobile device is presented at a point of sale for use in a payment transaction. A selection of a primary account is received from a user of the mobile device, and the mobile device automatically identifies a product type of the primary payment account. The mobile device selects and transmits a proxy payment account identifier having a product type equivalent to the product type of the primary payment account to the point of sale for use in the payment transaction. The point of sale causes a first payment authorization request message to be routed to an issuer of the proxy payment account.

8 Claims, 7 Drawing Sheets

METHODS AND SYSTEMS FOR PROVIDING A PAYMENT ACCOUNT WITH ADAPTIVE INTERCHANGE

CROSS-REFERENCE TO RELATED APPLICATION

This application claims the benefit of and priority to U.S. provisional patent application Ser. Nos. 61/578,338 (filed Dec. 21, 2011) and 61/727,979 (filed Nov. 19, 2012), which provisional patent applications are incorporated herein by reference in their entirety for all purposes.

FIELD

Embodiments relate to payment card processing systems and methods. More particularly, embodiments relate to methods and systems for providing a payment account for use on a mobile device which has adaptive interchange.

BACKGROUND

Embodiments disclosed herein relate to payment devices. In particular, some embodiments relate to methods, apparatus, systems, means and computer program products for providing and operating a payment account for use on a mobile device, where the payment account has an adaptive interchange feature.

Advances in mobile and communication technologies have created tremendous opportunities, one of which is providing users of mobile devices an ability to initiate payment transactions using their mobile device. One approach to enable mobile devices to conduct payment transactions is to provide the mobile device with a near field communication ("NFC") payment device in the mobile device. For example, mobile phones may be configured to operate as a PayPass® payment device have been proposed.

In one approach to implementing a mobile phone configured to operate as a PayPass payment device, a mobile payment application is provisioned in the mobile phone. The mobile payment application may store payment account information associated with a payment account held at or administered by a program administrator (such as Apple® in the case of an Apple administered payment application). The payment account information associated with the payment application may be a prepaid account. The consumer registers a primary payment card with the program administrator (e.g., by providing account and other information associated with a credit or debit card for use in transactions). Then, when the mobile device is used to make a purchase, the payment application transmits information associated with the prepaid account to the merchant for use in the purchase transaction. The merchant routes the prepaid account in a payment authorization request to a payment network, which routes the authorization request to the program administrator (for example, the prepaid account may have an identifier, such as a BIN, which identifies the program administrator) for authorization. The program administrator identifies the prepaid account and determines which primary payment card is associated with the account. The program administrator then creates a further payment authorization request with the primary payment card information in place of the prepaid account information. The further payment authorization request is transmitted to the issuer of the primary payment card for authorization.

Unfortunately, such an approach can lead to an imbalance in the interchange fees assessed. This imbalance is often funded by the program administrator, but may also be passed on to the consumer (either directly or indirectly as a program cost). The imbalance in fees may occur as follows. If the payment account associated with the payment application on the mobile device is a prepaid debit account, the transaction between the merchant and the program administrator may be assessed a first interchange rate. If the primary payment card associated with the consumer account is a credit card, the transaction between the program administrator and the issuer of the credit charge may be assessed a second interchange rate. The difference between the first interchange rate and the second interchange rate can be substantial.

As a specific illustrative example, if the purchase transaction totals $100, and the payment account is a prepaid debit account, the merchant may pay the program administrator 1.5% interchange (or $1.50). If the primary payment card is a credit card, the program administrator may pay the issuer 2.3% interchange (or $2.30) resulting in a net imbalance of $0.80—that is, the program administrator loses $0.80 on the transaction.

It would be desirable to provide mobile payment accounts which avoid such an interchange imbalance by providing a mobile payment account which adapts the interchange assessed based on the primary payment card to be used in a transaction.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments and which are not necessarily drawn to scale, wherein.

DETAILED DESCRIPTION

Figure 1:
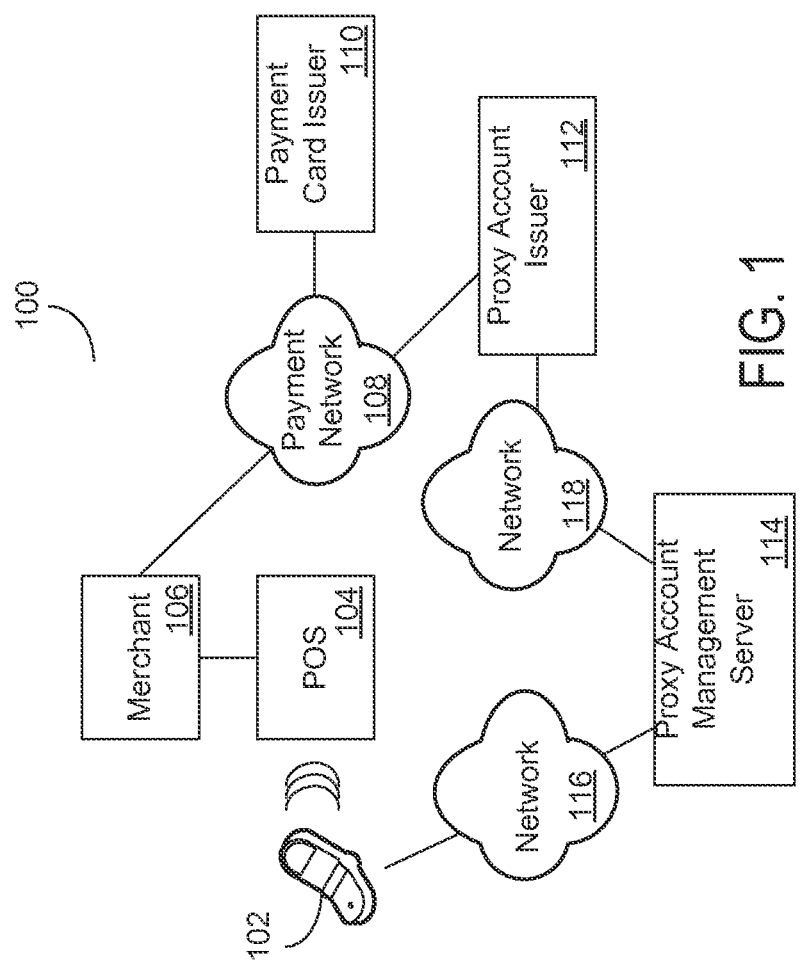
FIG. 1 is a block diagram that illustrates a system provided in accordance with aspects of the present invention.

Pursuant to some embodiments, systems, methods, apparatus, and means for conducting payment transactions using mobile devices are provided in which a mobile device is presented at a point of sale for use in a payment transaction. A selection of a primary account is received from a user of the mobile device, and the mobile device automatically identifies a product type of the primary payment account. The mobile device selects and transmits a proxy payment account identifier having a product type equivalent to the product type of the primary payment account to the point of sale for use in the payment transaction. The point of sale causes a first payment authorization request message to be routed to an issuer of the proxy payment account. The first payment authorization request message includes information identifying the proxy payment account, and a purchase amount of the payment transaction, and is assessed a first interchange fee at a first interchange rate. The issuer of the proxy payment account causes a second payment authorization request message to be routed to an issuer of the primary payment account, and includes information identifying the primary payment account and the purchase amount. The second payment authorization request message is assessed an interchange fee that is equivalent to the first interchange fee at the first interchange rate. The issuer of the primary payment account generates a payment authorization response approving or declining the transaction, which approval or decline is forwarded to the point of sale to complete the payment transaction.

Pursuant to some embodiments, a processing system, method, apparatus and program code are provided to receive a first authorization request associated with a transaction at a point of sale, the first authorization request including information identifying a transaction amount and a proxy account identifier, the first authorization request assessed a first interchange fee at a first interchange rate, and to determine, based on the proxy account identifier, an associated proxy payment account, the associated proxy payment account associated with a funding payment account. A second authorization request is generated including information identifying the transaction amount and an identifier associated with the funding payment account, and the second authorization request is transmitted to an issuer of the funding payment account for authorization of the transaction, where the second authorization request is assessed an interchange fee substantially equivalent to the first interchange fee and at the first interchange rate.

In some embodiments, a method, system, apparatus and program code are provided to configure a mobile device for use as a payment device which include receiving, at a proxy account management server, a request to configure a mobile device for use as a payment device, the request including information identifying a primary payment account for use in payment transactions involving the mobile device, said information including a primary account number associated with the primary payment account. A product type of the primary payment account is determined, and a proxy account is issued for use with the mobile device, where the proxy account is a prepaid debit account. A proxy account identifier is generated and associated with (i) the proxy account and (ii) the primary payment account number, where the proxy account identifier is generated to have a product type equivalent to the product type of the primary payment account. The proxy account identifier is transmitted to the mobile device for use in conjunction with a payment application stored on the mobile device to configure the mobile device and the proxy account identifier for use in payment transactions involving the mobile device.

The result are methods, systems, apparatus and program code which allow a mobile device to be used as a payment device in conjunction with a proxy account such that the product type of a proxy account identifier matches the product type of the primary payment account the consumer wishes to use for the transaction, thereby avoiding or reducing any interchange imbalance. Embodiments provide systems and methods that allow entities to easily issue and administer proxy accounts for use in mobile payment applications while avoiding interchange imbalances that can increase the cost of administering and issuing such programs.

A number of terms are used herein for ease of exposition and convenience. For example, the term "PayPass" is used to refer to a contactless payment method. Those skilled in the art will appreciate that embodiments may be used with other contactless payment schemes as well.

As used herein, the term "issuer" is used to refer to the financial institution or entity that issues a payment account (such as a debit or credit account) to a cardholder. The issuer of a payment card maintains the payment card accounts of its cardholders. As used herein, the term "acquirer" refers to a financial institution or other entity which has a relationship with a merchant who accepts payment cards for payment of transactions entered into by cardholders. To initiate transactions in the payment card system, merchants accept payment cards and transmit authorization requests to acquirers.

The operator of the payment card system (e.g., the assignee hereof) is sometimes referred to as the "payment card system operator" or just the "operator". The payment card system operator operates a payment processing system that receives authorization requests for purchase transactions from the acquirers and routes the requests to the issuers of the payment cards. An example of a payment processing system is the "Banknet" system, which is operated by the assignee hereof. The payment card system operator also operates a clearing system by which settlement of transactions occurs between issuers and acquirers.

One aspect of a typical payment card system is referred to as "interchange". An interchange fee is a small fee paid by the acquirer to the issuer with respect to a particular transaction. The purpose of the interchange fee is to compensate the issuer for a portion of the risks and costs it incurs. Interchange rates/fees are only one of the many cost components of the "merchant discount rates" that are paid by merchants in exchange for card acceptance services provided by acquirers to merchants.

Interchange rates may in some cases be established on the basis of a bilateral agreement between an issuing bank and an acquiring bank. However, for many transactions in a payment card system, the interchange fee for a particular transaction is based on a "default" interchange rate established by the payment card system operator. Such interchange rates are "default" in the sense that they apply in the absence of a bilateral agreement between the issuer and the acquirer bank.

Interchange fees are a necessary and efficient method for maintaining a strong and vibrant payment card system. Setting interchange rates is a challenging proposition that involves an extremely delicate balance. If interchange rates are set too high, such that they lead to disproportionately high merchant discount rates, then merchants' desire and demand to accept a particular brand of payment card may be reduced. However, if interchange rates are set too low, then issuers' willingness to issue and promote the brand of payment cards will be reduced, and cardholders' demand for the brand of payment cards will also be reduced. In response to these competitive forces, a payment card system operator may strive to maximize the value of the payment card system (including total dollars spent with the system's cards, the number and types of cards in circulation, and the number and types of merchants accepting the system's cards) by setting default interchange rates at levels that balance the benefits and costs to both cardholders and merchants.

In a typical arrangement, the payment card system operator publishes interchange rates that apply to various categories of transactions. During the process of clearing the transactions, the acquirers determine which rates apply to the transactions based on information about the transactions received from the merchants.

A published set of interchange rates may apply, for example, to transactions submitted by merchants in the United States and charged to payment card accounts issued in the United States. Another set of interchange rates may apply to transactions submitted by merchants in the United States and charged to payment card accounts issued outside of the United States. Similarly, other sets of interchange rates may apply to transactions submitted by merchants in other countries, based on payment card accounts issued in those countries or outside of those countries.

Interchange rate tables may be organized by the type of card product (herein, a "product type") under which the payment card account is issued. For illustration, different product types may include credit, debit, and prepaid debit (although those skilled in the art will appreciate that additional product types may also be identified and assessed different interchange rates).

As used herein, a payment transaction involving a mobile device configured to operate pursuant to the present invention will be described with reference to several different payment accounts. A first account will be referred to as a "proxy payment account" and is associated with a "proxy account issuer" or "proxy payment account issuer". The proxy payment account is associated with a proxy account identifier (or "proxy PAN") and other account identifying information that allows transactions involving the account to be routed to the proxy account issuer for further processing. A second account will be referred to as a "primary payment account" or "primary account" and is associated with a "primary payment account issuer" or "primary account issuer". The primary payment account is associated with a primary account identifier (or "primary account PAN") and other account identifying information that allows transactions involving the account to be routed to the primary issuer for further processing. The "proxy payment account" may be an account issued by a program administrator or other entity that wishes to provide or facilitate payment functionality for mobile devices.

For clarity and ease of exposition, an illustrative example will be provided and referenced herein to describe features of some embodiments of the present invention. In the example, a consumer has two primary accounts: a credit card account issued by a first bank, and a debit card account issued by a second bank. The consumer also has a mobile device (in the example, a smart phone with an NFC capability). The consumer wishes to be able to conduct payment transactions using the smart phone. To do so, the consumer causes a mobile payment application to be installed on the smart phone. During a personalization process, a proxy payment account is configured on the mobile payment application. The proxy payment account allows transactions involving the mobile phone to be routed to a proxy payment account issuer for further processing as described further herein. In some embodiments, the consumer is able to select which of his two primary accounts is used in any given transaction (e.g., the consumer may choose to use his credit card account or his debit card account). Further, pursuant to some embodiments, an adaptive interchange process is performed once the consumer selects which primary payment account is to be used. The dynamic interchange process ensures that the proxy issuer is not subject to an imbalance of interchange fees. For example, if the consumer selects to use his debit card account in a transaction, the dynamic interchange process ensures that a product type of the proxy account be set to be a "debit card" product type (matching the product type of the consumer's debit card). The result is a mobile transaction process which provides a number of desirable advantages to consumers and other entities.

Features of some embodiments will now be described by reference to FIG. 1, which is a system diagram of certain components/participants in an illustrative transaction pursuant to the present invention. As shown, a cardholder operates a mobile device 102 to conduct a payment transaction with a merchant 106 through a point of sale ("POS") terminal 104. The mobile device 102 may be a mobile phone (such as, for example, a "smart phone" configured to operate with an operating system such as the Android® operating system or the like) or a portable computing device. Pursuant to some embodiments, the mobile device 102 has a payment application installed thereon which allows the mobile device 102 to operate as a payment device. That is, mobile device 102 may be presented at a merchant point of sale terminal 104 to initiate a payment transaction. Further details of some embodiments of a mobile device 102 will be described below in conjunction with FIG. 4 and other drawings.

The payment application may be configured to allow the mobile device 102 to operate as a PayPass® payment device (allowing near field communication with a POS terminal 104) or pursuant to other payment standards. The use of the PayPass® standard is described herein as an illustrative example, and those skilled in the art, upon reading this disclosure, will appreciate that features of the present invention may be used with desirable results in other types of payment applications. Interaction between the mobile device 102 and the POS terminal 104 may involve a proximity reader component (shown and described in conjunction with FIG. 2 and elsewhere herein).

As will be recognized by those who are skilled in the art, the proximity reader component and the POS terminal 106 may be located at the premises of a retail store and operated by a sales associate of the retailer for the purpose of processing retail purchase transactions. The mobile device 102 is shown in FIG. 1 to be interacting with the POS terminal 106 for the purpose of executing such a purchase transaction. Some details of the POS terminal 106 are presented below in conjunction with FIG. 6.

The payment application stored on the mobile device 102 may be personalized by a process in which user and/or account specific information is loaded onto the mobile device 102. For example, the personalization process may include storage of cardholder information as well as payment account information into an integrated circuit ("IC") or memory of the mobile device 102. In some embodiments, the information may be communicated to the mobile device 102 over the air ("OTA") via a mobile communication network by a data communication session between the mobile device 102 and a remote server, such as the server 114 of FIG. 1. Further, in some embodiments, a user of the mobile device 102 may be required to download a payment application onto the mobile device 102. The payment application may be a software program or application that controls the mobile device 102 to provide its payment functionality.

In some embodiments, the personalization process is performed under control of the MasterCard® Over-the-Air Provisioning Service ("MOTAPS"). In some embodiments, the MOTAPS service is accessed by interacting with an Application Programming Interface ("API") during the personalization process, as well as during subsequent transactions (e.g., during processing in which the consumer selects a primary payment account for use in a transaction). Use of a provisioning service such as MOTAPS provides a cost-effective and secure method for issuers (such as the issuer of the proxy account) to securely transfer the cardholder's payment account information, via a Mobile Network Operator ("MNO"), into the cardholder's Near Field Communication ("NFC") enabled mobile device 102. The cardholder is then able to use the mobile device 102 as a standalone PayPass device.

In accordance with aspects of the present invention, the personalization information loaded into the mobile device 102 via the personalization channel or process may include storing information associated with a payment account that can be used to allow the mobile device 102 to perform payment transactions (e.g., using the PayPass® standard). In some embodiments, the payment account personalized on the mobile device 102 is a "proxy" account which is essentially a prepaid account issued by a proxy card issuer 112 and which is used to support payment transactions pursuant to the present invention. In some embodiments, when a transaction is conducted using the mobile device 102, the payment application on the mobile device 102 transmits information associated with the proxy account to the merchant 106 through a POS terminal 104 for routing through the payment network 108 (e.g., a transaction authorization request message is created for the transaction including the transaction amount and the primary account number associated with the proxy account).

Those skilled in the art will appreciate that communication between the merchant 106 and the payment network 108 is likely through an acquirer via one or more acquirer computers or systems (not shown). The acquirer systems may operate in a conventional manner to receive an authorization request for the transaction from the POS terminal 106. The acquirer systems may route the authorization request via a payment network 108 to one or more systems (such as server computers) operated by an issuer of the payment card account associated with the mobile device 102. As described herein, authorization requests associated with a mobile device 102 configured pursuant to the present invention may be routed to a proxy account issuer 112. Further, pursuant to some embodiments, an authorization response message may be routed through the payment network 108 to the acquirer associated with the merchant 106 and the POS terminal 104 based on authorization processing performed by the proxy account issuer 112 as well as one or more primary funding account issuers 110 as described herein.

The proxy account number associated with the proxy account includes information usable by the payment network to route the transaction authorization request message to the proxy account issuer 112 for further authorization processing (e.g., the proxy account number may include a bank identification number, or "BIN", identifying the proxy account issuer 112). The proxy account issuer 112 may then create an updated transaction authorization request message which replaces the proxy account information with the information associated with a primary payment account designated by the cardholder for use in the transaction. The updated transaction authorization request message may then be routed through the payment network 108 to the issuer 110 (or an agent of the issuer) of the primary payment account for authorization processing.

As described above, in situations where the proxy account is a prepaid account, the interchange assessed with the transaction leg between the merchant 106 and the proxy card issuer 112 may be assessed at a rate associated with prepaid card transactions. However, pursuant to some embodiments, a dynamic interchange feature may be applied before the transaction authorization request is created. For example, pursuant to some embodiments, prior to creation of the transaction authorization request message, the mobile device 102 may be caused to interact with proxy account management server 114 to determine the product type associated with the primary payment card used in conjunction with the transaction. The product type may then be used to change the product type identified in the transaction authorization request generated by the POS terminal 104/merchant 106. Pursuant to some embodiments, this interaction is performed prior to the transaction by a registration process in which the cardholder registers one or more primary payment accounts for use in conjunction with one or more proxy payment accounts. The registration process causes information to be personalized in the mobile device 102 such that one or more proxy payment account identifiers are stored in the mobile device 102, where each of the proxy payment account identifiers has a "product type" that matches the product type of the associated primary payment account. Pursuant to some embodiments, the transaction authorization request message may still be routed to the proxy card issuer 112 (i.e., the BIN associated with the proxy payment card may be unchanged), however, the routing of the transaction authorization request may be assessed an interchange at a rate that is equivalent to that which is assessed in the transaction leg between the proxy card issuer 112 and the payment card issuer 110.

Figure 2:
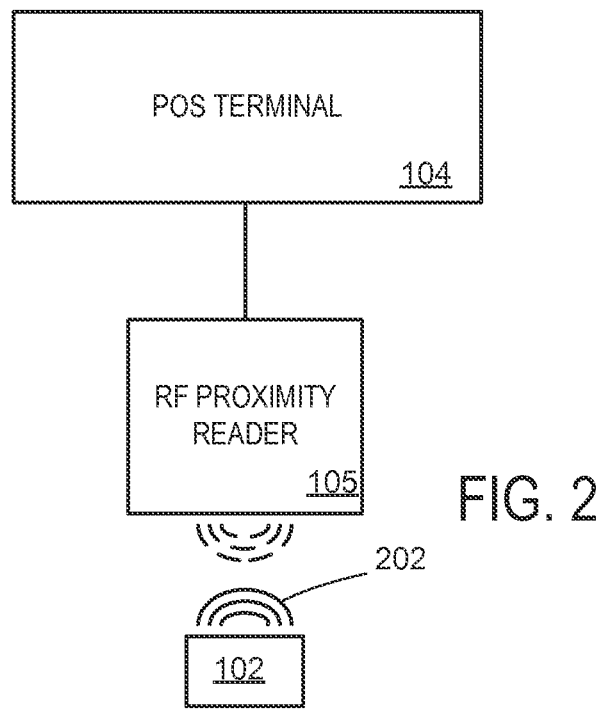
FIG. 2 is a block diagram that illustrates communication aspects of a purchase transaction that utilizes a payment-enabled mobile device.

FIG. 2 schematically illustrates some communication aspects of a typical purchase transaction in which the mobile device 102 is used. The POS terminal is represented at block 104, and the proximity reader component is represented by block 105. Wireless communication between the mobile device 102 and the proximity reader component 105 is indicated at 202. The wireless communication 202 may be conducted in accordance with one or more standard protocols, such as "EMV Contactless" and/or NFC all of which are well known to those who are skilled in the art.

Figure 3:
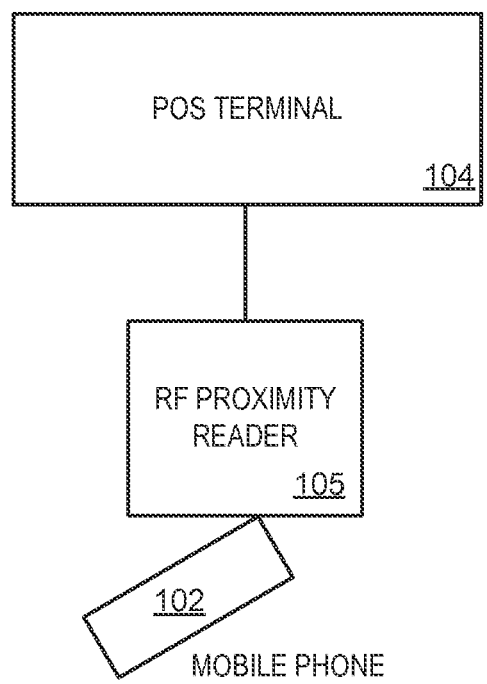
FIG. 3 is a block diagram that illustrates physical aspects of the transaction shown in FIG. 2.

FIG. 3 schematically illustrates some physical aspects of the purchase transaction. As in FIG. 3, the POS terminal 104 and its associated proximity reader component 105 are shown. The mobile device 102 is also shown in proximity to the proximity reader component 105. In a common manner of initiating the wireless communication depicted in FIG. 2, the user of the mobile device 102 briefly taps the mobile device 102 at a particular location on the proximity reader component 105. The location on the proximity reader component 105 at which the mobile device 102 is to be tapped may be indicated to the user by a standard logo affixed to the proximity reader component 105, such as the "PayPass" logo.

Figure 4:
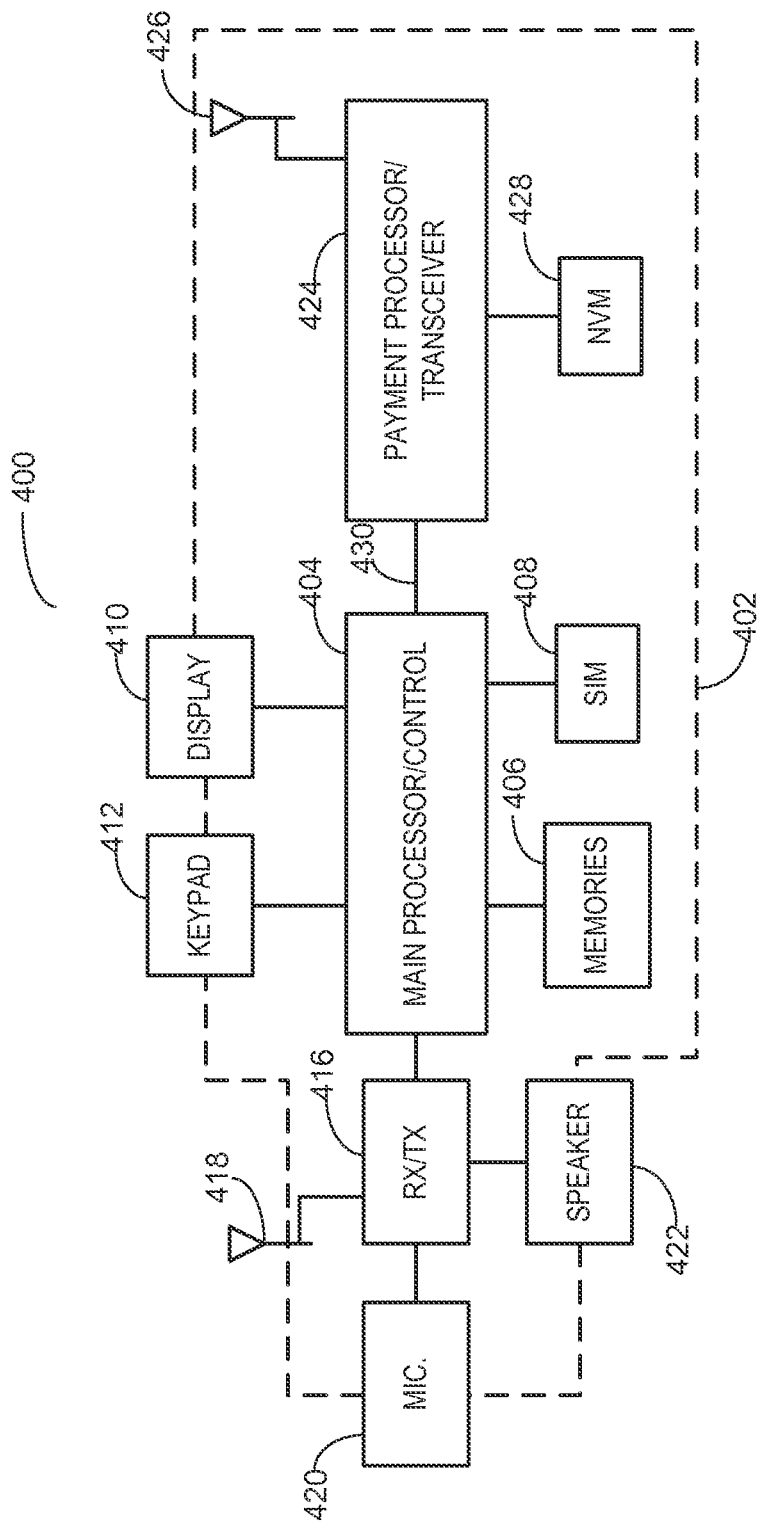
FIG. 4 is a block diagram that illustrates a payment-enabled mobile device pursuant to some embodiments.

FIG. 4 is a block diagram representation of the mobile device 102, as provided in accordance with aspects of the present invention. The mobile device 102 may be conventional in its hardware aspects. For example, the mobile device 102 may resemble, in most of its hardware aspects and many of its functions, a conventional "smart phone" such as the "iPhone" marketed by Apple Inc.

The mobile device 102 may include a conventional housing (indicated by dashed line 402 in FIG. 4) that contains and/or supports the other components of the mobile device 102. The housing 402 may be shaped and sized to be held in a user's hand, and may for example fit in the palm of the user's hand.

The mobile device 102 further includes conventional control circuitry 404, for controlling over-all operation of the mobile device 102. For example, the control circuitry 404 may include a conventional processor of the type designed to be the "brains" of a smart phone.

Other components of the mobile device 102, which are in communication with and/or controlled by the control circuitry 404, include: (a) one or more memory devices 406

(e.g., program and working memory, etc.); (b) a conventional SIM (subscriber identification module) card 408; (c) a keypad 412 for receiving user input; and (d) a conventional display component 410 for displaying output information to the user. For present purposes the keypad 412 will be understood to include, e.g., a conventional 12-key telephone keypad, in addition to other buttons, switches and keys, such as a conventional rocker-switch/select key combination, soft keys, and send and end keys.

As is now frequently the case with smart phones, the functionality represented by the display 410 and keypad 412 may be provided in an integrated manner via a conventional touch screen, which is not indicated in the drawing apart from blocks 410 and 412.

The mobile device 102 also includes conventional receive/transmit circuitry 416 that is also in communication with and/or controlled by the control circuitry 404. The receive/transmit circuitry 416 is coupled to an antenna 418 and provides the communication channel(s) by which the mobile device 102 communicates via the mobile telephone communication network (not shown). The receive/transmit circuitry 416 may operate both to receive and transmit voice signals, in addition to performing data communication functions.

The mobile device 102 further includes a conventional microphone 420, coupled to the receive/transmit circuitry 416. Of course, the microphone 420 is for receiving voice input from the user. In addition, a loudspeaker 422 is included to provide sound output to the user, and is coupled to the receive/transmit circuitry 416.

In conventional fashion, the receive/transmit circuitry 416 operates to transmit, via the antenna 418, voice signals generated by the microphone 420, and operates to reproduce, via the loudspeaker 422, voice signals received via the antenna 418. The receive/transmit circuitry 416 may also handle transmission and reception of text messages and other data communications via the antenna 418.

The mobile device 102 may also include a payment circuit 424 and a loop antenna 426, coupled to the payment circuit 424. The payment circuit 424 may include functionality that allows the mobile telephone 102 to function as a contactless payment device. In some embodiments, the payment circuit 424 includes a processor (not separately shown) and a memory (not separately shown) that is coupled to the processor and stores program instructions for controlling the processor. Although shown as separate from the main processor 404, the payment circuit 424 and/or its processor component may be integrated with the main processor 404. Thus, the functionality represented by the payment circuit may be largely implemented with a payment application program (not shown in FIG. 4), that controls a portion of the operations of the main processor 404. The control aspect of the payment circuit 424 may also control a transceiver (also represented by block 424) which handles the short-distance wireless communications via the antenna 426. In accordance with conventional practices, and in accordance with some embodiments, the mobile device may include a so-called "secure element" (not separately shown), which may be incorporated with the payment circuit 424, the main processor 404 or the SIM card 408. As is familiar to those who are skilled in the art, the secure element may be constituted with a small processor and volatile and nonvolatile memory (NVM; block 428) that are secured from tampering and/or reprogramming by suitable measures.

The secure element may, for example, manage functions such as storing and reading out a payment card account number, and performing cryptographic processing. More particularly, pursuant to some embodiments, the secure element may store and read out information associated with one or more proxy payment accounts issued by a proxy account issuer 112 for use by the holder of the mobile device 102. The information associated with the proxy payment accounts may include an account number (generally referred to as a "PAN") as well as other information used to authorize transactions associated with the account number (such as, for example, an expiry date or the like).

The payment circuit 424 (to the extent it is a separate processor from main processor 404) may be in communication with the control circuitry 404 via a data communication connection 430.

Figure 5:
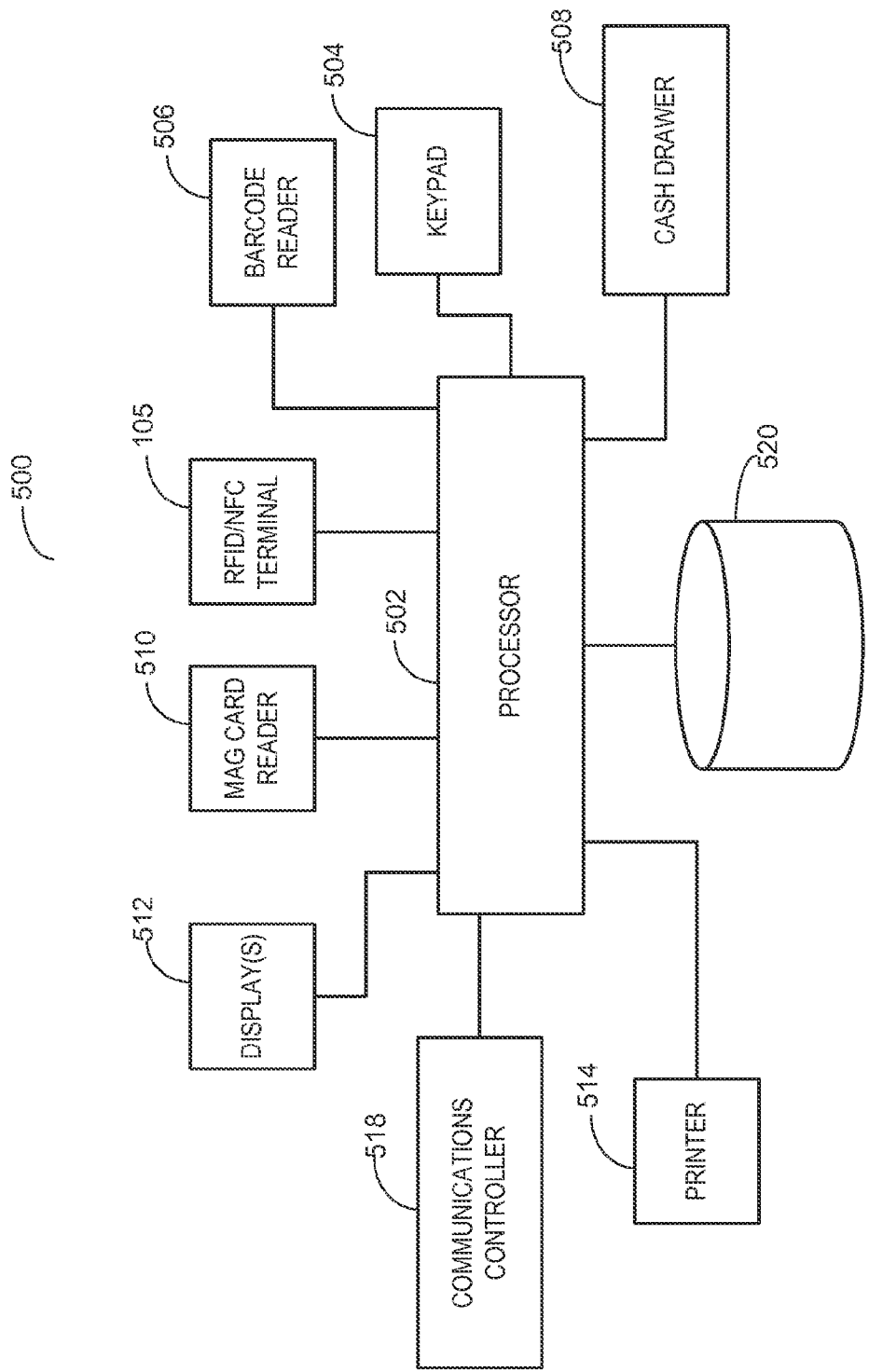
FIG. 5 is a block diagram representation of a typical POS terminal that may embody aspects of the present invention.

FIG. 5 is a block diagram of a typical embodiment of the POS terminal 104 depicted in FIG. 1 (and incorporating the proximity reader component 105—represented as an RFID/NFC terminal in FIG. 5). In some embodiments, the POS terminal 104 may be largely or entirely conventional in its hardware aspects. Nevertheless, the POS terminal 104 may be programmed in accordance with the aspects of the present invention to provide functionality as described herein.

The POS terminal 104 may include a processing element (or elements) such as the processor 502 shown in FIG. 5. The processor 502 may for example be a conventional microprocessor, and may operate to control the overall functioning of the POS terminal 104. The POS terminal 104 may also include conventional peripheral components, in communication with and/or controlled by the processor 502, such as: (a) a keypad 504 for receiving input from the human operator of the POS terminal; (b) a barcode reader 506 for reading product barcodes from products brought to the terminal for purchase; (c) a cash drawer 508 for storing cash received from customers; (d) a magnetic stripe reader 610 for reading payment card account numbers and related information from magnetic stripe payment cards; (e) one or more displays 512 for providing output (e.g., identifying products presented for purchase and their prices, indicating sales tax due, indicating transaction subtotals and totals, etc.); (f) a printer 514 for printing out sales receipts; (g) the above-mentioned proximity reader component 105, for exchanging wireless short range communications/near field communications (NFC) with contactless payment cards and/or with mobile telephones equipped with contactless payment device capabilities; and (h) a communication controller 518 for allowing the processor 502, and hence the POS terminal 104 to engage in communication over data networks with other devices (e.g., a merchant processing system (not shown), and an acquirer (FIG. 1) or its transaction processor (not shown)). (In some embodiments, at least one of the displays 512 may be a touch screen, so as to provide an input function as well as an output function.)

In addition, the POS terminal 104 may include one or more memory and/or data storage devices (indicated collectively at 520), which may comprise any combination of one or more of a hard disk drive, RAM (random access memory), ROM (read only memory), flash memory, etc. The memory/data storage device(s) 520 may store software and/or firmware that programs the processor 502 and the POS terminal 104 to perform functionality as described herein. Further, the POS terminal may include one or more housings (not shown) which contain and/or support one or more of the other components shown in FIG. 5.

Figure 6:
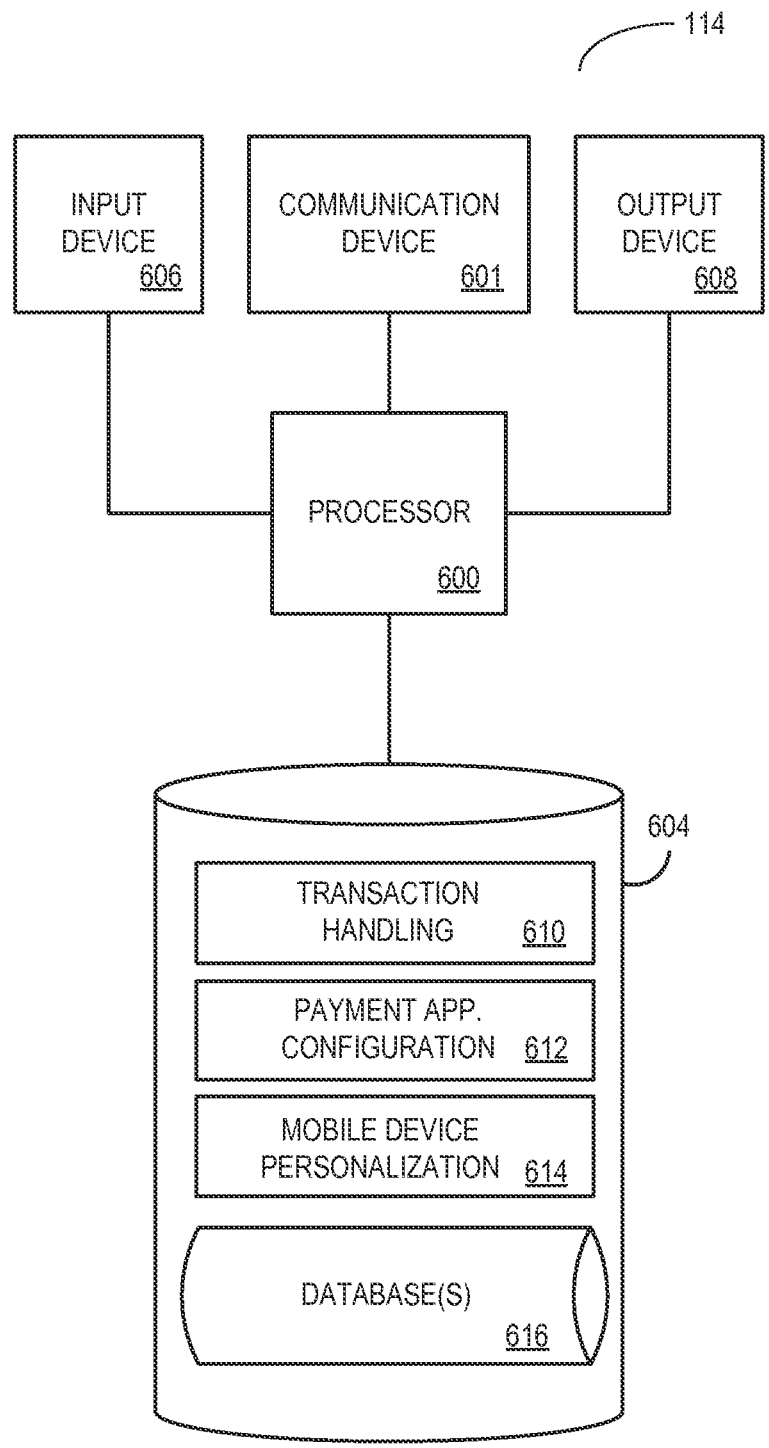
FIG. 6 is a block diagram representation of a server computer operated by a proxy payment account issuer or manager and depicted as part of the system of FIG. 1.

FIG. 6 is a block diagram that illustrates an embodiment of the proxy account management server computer 114 (FIG. 1). In some embodiments, the proxy account management server computer 114 and the proxy account issuer computer 112 are deployed on the same server or servers (e.g., the functions performed by both the proxy account management server computer 114 and the proxy account issuer computer 112 are performed by the same server or servers in a networked environment controlled by a common or related entity).

The proxy account management server computer 114 may be conventional in its hardware aspects but may be controlled by software to cause it to function as described herein. For example, the proxy account management server computer 114 may be constituted by conventional server computer hardware.

The proxy account management server computer 114 may include a computer processor 600 operatively coupled to a communication device 601, a storage device 604, an input device 606 and an output device 608.

The computer processor 600 may be constituted by one or more conventional processors. Processor 600 operates to execute processor-executable steps, contained in program instructions described below, so as to control the proxy account management server computer 114 to provide desired functionality.

Communication device 601 may be used to facilitate communication with, for example, other devices (such as the payment network 108 or, as will be seen, the mobile device 102 via an over-the-air communication channel shown as network 116 in FIG. 1). For example, communication device 601 may comprise numerous communication ports (not separately shown), to allow the proxy account management server computer 112 to communicate simultaneously with a number of other computers and other devices, including communications as required to simultaneously handle numerous transaction authorization requests from the payment network 108 (in embodiments where the functionality of the proxy account issuer 112 and the proxy account management server 114 are provided by the device shown in FIG. 6).

Input device 606 may comprise one or more of any type of peripheral device typically used to input data into a computer. For example, the input device 606 may include a keyboard and a mouse. Output device 608 may comprise, for example, a display and/or a printer.

Storage device 604 may comprise any appropriate information storage device, including combinations of magnetic storage devices (e.g., magnetic tape and hard disk drives), optical storage devices such as CDs and/or DVDs, and/or semiconductor memory devices such as Random Access Memory (RAM) devices and Read Only Memory (ROM) devices, as well as so-called flash memory. Any one or more of such information storage devices may be considered to be a computer-readable storage medium or a computer usable medium or a memory.

Storage device 604 stores one or more programs for controlling processor 600. The programs comprise program instructions (which may be referred to as computer readable program code means) that contain processor-executable process steps of the proxy account management server computer 114, executed by the processor 600 to cause the proxy account management server computer 114 to function as described herein.

The programs may include one or more conventional operating systems (not shown) that control the processor 600 so as to manage and coordinate activities and sharing of resources in the proxy account management server computer 114, and to serve as a host for application programs (described below) that run on the proxy account management server computer 114.

The programs stored in the storage device 604 may also include a transaction handling application program 610 that controls the processor 600 to enable the proxy account management server computer 114 to handle various transactions, including authorization requests for purchase transactions involving proxy accounts pursuant to the present invention as well as to handle requests to issue or manage proxy accounts pursuant to the present invention.

Another program that may be stored in the storage device 604 is an application program 612 that selects configuration options for payment application programs loaded or to be loaded in the mobile devices 102 that operate with the system of the present invention. For example, in some embodiments, individual cardholders who choose to install payment applications on their mobile devices 102 may be allowed to associate one or more funding accounts with the payment application. As an illustrative example, a cardholder may choose to associate two different payment card accounts with the payment application on their mobile device—a credit card account associated with a first bank, and a debit card account associated with a second account. The cardholder may provide this information to the proxy account management server computer 114 via a Web interface or by interacting with the payment application on their mobile device 102 after the payment application has been installed on the mobile device 102. For example, the cardholder may provide detailed information associated with each of the funding payment accounts including the fund payment account's account number, expiry date, and cardholder verification information (such as a CVV or CVC code). The proxy account management server computer 114 securely stores the primary funding account information and issues or generates a proxy account PAN associated with each of the primary funding accounts. The proxy account PANs generated for a cardholder are securely transmitted to the payment application (e.g., for secure storage in a secure element of the cardholder's mobile device 102). Pursuant to some embodiments, the proxy account PAN generated for each primary funding account is generated such that a product type of the proxy account PAN is selected to match the product type of the associated primary funding account. In the illustrative example, a first proxy account PAN having a product type of "credit card" may be generated and associated with the cardholder's credit card account issued by the first bank, and a second proxy account PAN having a product type of "debit card" may be generated and associated with the cardholder's debit card account issued by the second bank.

The programs stored in the storage device 604 may also include an application 614 that programs the proxy account management server computer 114 to manage personalization of mobile devices (and possibly other payment devices as well) authorized by the proxy account issuer 112 to access proxy payment card accounts issued by the issuer 112. The proxy account management server computer 114 may perform conventional personalization functions in addition to the operations described herein. (Or, in other embodiments, the personalization and payment application configuration functions may be handled by another computer—operated by or on behalf of the issuer—that is separate from, but possibly cooperative with, the proxy account management server computer 114.)

The storage device 604 may also store, and the proxy account management server computer 114 may also execute, other programs, which are not shown (such as device drivers or the like).

The storage device 604 may also store one or more databases 616 required for operation of the proxy account management server computer 114, including data (1) identifying registered users and their associated mobile device 102 and the payment application stored thereon, (2) individual proxy PANs assigned to registered users as well as the primary funding account associated with each proxy PAN, regarding users' payment card account balances and transactions.

Figure 7:
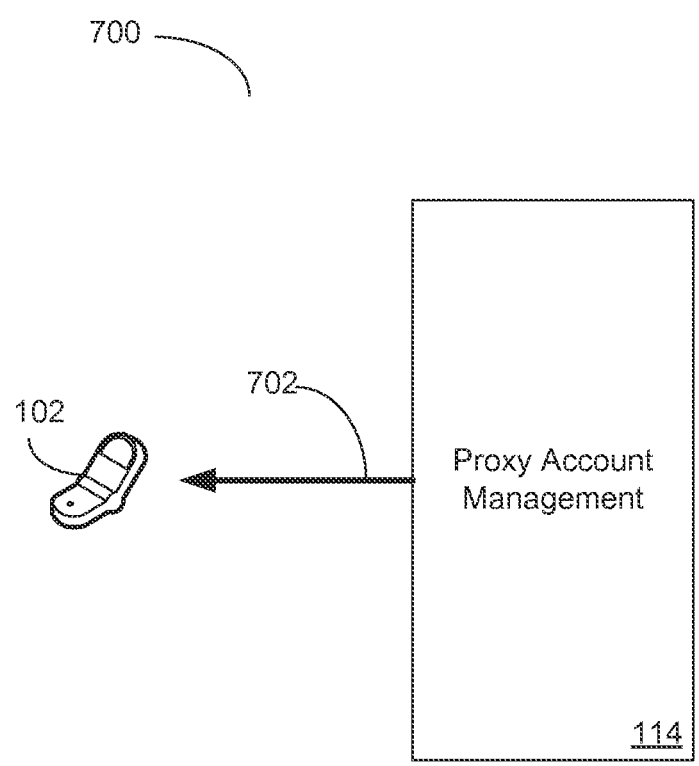
FIG. 7 schematically illustrates a process for personalizing a payment-enabled mobile device.

FIG. 7 schematically illustrates personalization of a mobile device 102 for payment enablement purposes. As before, block 114 represents a server computer operated by or on behalf of a proxy account issuer (financial institution) of proxy payment card accounts. The proxy account management server computer 114 is the source of information that is loaded into the mobile device 102 for the purpose of "personalizing" the mobile device 102. Arrow 702 schematically illustrates a communication channel by which the personalization information is transmitted from the proxy account management server computer 114 to the mobile device 102.

As is familiar to those who are skilled in the art, "personalization" refers to the process by which user- and/or account-specific information is loaded into and/or otherwise applied to a payment device (e.g., a contactless payment card or payment-enabled mobile telephone or mag stripe payment card). In connection with traditional mag stripe payment cards, the personalization process includes magnetically storing the cardholder's name and the payment card account number and other information on the mag stripe, and also printing/embossing the cardholder's name and account number, etc., on the plastic body of the card. For a conventional contactless payment card, personalization may include similar printing or embossing, plus storage of cardholder name and account number and other information by RF wireless communication into an integrated circuit (IC) embedded in the body of the contactless payment card.

Personalization of a mobile device 102 also entails storage of information in an IC or secure element contained within the mobile device 102. According to one conventional proposal, the information is communicated to the mobile device 102 over the air (OTA) via the mobile communication network by a data communication session between the mobile device and the issuer's server (such as the proxy account management server 114). It has also been proposed that personalization of the mobile telephone may include the downloading to the mobile device 102 of the payment application program.

The above-mentioned OTA communication channel may be one embodiment of the personalization channel 702 shown in FIG. 7. According to another proposal (and as disclosed in co-pending and commonly assigned U.S. patent application Ser. No. 11/870,144—published as U.S. Publication No. 2009/0100511), the personalization information for a particular user's mobile device is loaded into a contactless IC card from the issuer's server computer and then the contactless IC card is sent to the user. The user/cardholder then brings the contactless IC card into proximity with the mobile device 102 to permit loading of the personalization information via RF communication from the IC card to the mobile device 102. This technique is another possible embodiment of the personalization channel 702 shown in FIG. 7. The contactless IC card described in this paragraph, into which programs and/or data are loaded to in turn be loaded into a mobile telephone or other device, may hereinafter be referred to as a "personalization card" or "perso card", for short.

In other embodiments, the personalization channel 702 may be constituted by any other personalization technique previously or hereafter proposed.

In some embodiments, the personalization (or "pre-personalization") of a mobile device 102 by the proxy account management server 114 may include loading the payment application program into the mobile device 102 and/or configuration of the payment application program to store one or more proxy PANs as described herein. For example, whichever personalization process is used, the end result is that one or more proxy PANs are stored in a memory of the mobile device 102 in such a way that they are accessible for use by the payment application of the mobile device 102 for use in conducting payment transactions as described herein.

Figure 8:
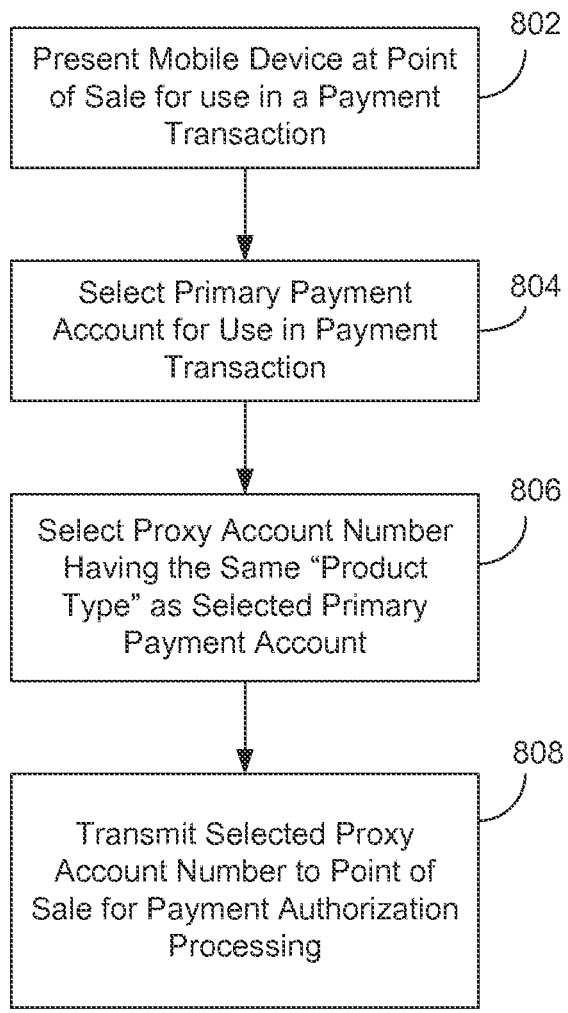
FIG. 8 is a flow chart that illustrates a process that may be performed in the system of FIG. 1 according to aspects of the present invention.

Reference is now made to FIG. 8 which is a transaction flow diagram depicting portions of a payment transaction process 800 involving a mobile device 102 at a POS terminal 104. Process 800 begins at 802 where a consumer holding a mobile device 102 (which has been configured with a mobile payment application pursuant to the present invention) presents the mobile device 102 at a POS terminal 104 for use in a payment transaction. For example, processing at 802 may occur after the consumer has brought one or more items to a checkout counter and the items have been scanned or otherwise processed by the checkout terminal and the terminal is ready for the consumer to provide some form of payment for the items. The consumer may select a pay by mobile or pay by PayPass option and tap or otherwise present the mobile device 102 to an NFC reader device 105 associated with the POS terminal 104 to cause payment account information to be wirelessly transmitted from the mobile device 102 to the POS terminal 104. Before the payment account information is transmitted to the POS terminal 104, several further processing steps may occur under control of the payment application of the mobile device 102.

In some embodiments, the consumer may first be prompted (e.g., by a display screen on the mobile device 102) to select a primary payment account for use in the transaction. For example, one or more card images or other information may be displayed to the consumer, each card image or other information associated with individual primary payment accounts previously registered by the cardholder (e.g., during interaction with a proxy account management server 114 during a personalization or registration process). The card images or other information may be presented to the consumer under control of the payment application which may, in some embodiments, select only those accounts available for use in the transaction. For example, in some embodiments, the payment application may determine (based on information received from the POS terminal 104 at step 802) that only certain ones of the primary payment accounts associated with the payment application are suitable for use in the present transaction (e.g., by comparing a merchant identifier received from the POS terminal 104 to information associated with individual primary payment accounts of the consumer to identify those primary payment accounts that are available for use at the merchant). For example, in the illustrative example introduced above, the consumer has registered information associated with a credit card account and a debit card account. At 804, the consumer may be presented with a request to select one of those two primary payment accounts for use in the conducting the current transaction. The consumer may be prompted using a visual display on the mobile device 102. For example, the payment application may cause an image of the consumer's credit card account and an image of the consumer's debit card account to be displayed on a display screen of the mobile device 102 along with a prompt to select between the two accounts.

Processing continues at 806 where the payment application on the mobile device 806 (or, in some embodiments, an application associated with the POS terminal 104) identifies a "product type" associated with the selected primary payment account. For example, if the consumer selects to use a credit account, the product type may be identified as "credit". If the consumer selects to use a debit account, the product type may be identified as "debit". Processing at 806 further includes a selection by the payment application of an appropriate proxy account stored on the mobile device 102. For example, in the illustrative embodiment, one proxy account may be associated with the consumer's credit card account, while another proxy account may be associated with the consumer's debit card account. In some embodiments, the payment application automatically selects the appropriate proxy account such that a proxy account identifier (including the associated proxy account number or "proxy PAN") is selected which has a product type that matches the product type of the primary payment account the consumer wishes to use in the transaction.

In some embodiments, a single proxy account identifier is associated with the payment application, and a product type of the proxy account is modified during a transaction to ensure that the product type matches the product type of the selected primary payment account.

Once an appropriate proxy account identifier has been selected (which has a product type that matches the selected primary payment account), processing continues at 808 where the payment application of the mobile device 102 causes the selected proxy account information from the payment application to be transmitted to the POS terminal 104. The proxy account information, as well as the product type information, is transmitted from the mobile device 102 to the POS terminal 104. The POS terminal 104 then uses the information to create a first payment authorization request message to be transmitted to the payment network 108. The payment network 108 uses information in the first payment authorization request message to route the authorization request to the proxy account management server 114 (or the proxy account issuer 112) for further authorization processing. In particular, the proxy account issuer 112 (or the proxy account management server 114) receives the first payment authorization request message and uses the proxy PAN in the payment authorization request message to look up or otherwise identify the primary payment account associated with the received proxy PAN. Information associated with the identified primary payment account is then used to create a second payment authorization request message. The second payment authorization request message may include, for example information identifying: (1) the identified primary payment account, (2) stored expiry and cardholder verification data associated with the primary payment account, (3) transaction details from the first payment authorization request message (including the transaction amount, a merchant identifier, a transaction identifier, and the like), and, in some embodiments (4) information identifying that the transaction involved a proxy payment account (e.g., which information may be transmitted in one or more message fields of the second payment authorization request message).

The second payment authorization request message is then transmitted from the proxy account issuer 112 (or proxy account management server 114) to a primary account issuer 110 through the payment network 108. The primary account issuer 110 receives the second payment authorization request message and performs standard authorization processing to authorize or decline the transaction as if the consumer presented the primary payment account at the POS terminal 104. The primary account issuer 110 then generates a first payment authorization response message (including details of the approval or decline) and transmits the first payment authorization response message to either (1) the proxy account issuer 112 (or proxy account management server 114), or (2) directly to the merchant 106 (via the merchant's acquirer) through the payment network 108. In embodiments where the first payment authorization response message is transmitted to the proxy account issuer 112 (or proxy account management server 114) processing may further include the proxy account issuer 112/management server 114 logging information associated with the authorization response and generating a second payment authorization response message which is transmitted to the merchant 106 to complete the transaction.

The result is a transaction method which allows a proxy account to be used in which a proxy account identifier has been selected such that the product type of the proxy account identifier matches the product type of the primary payment account the consumer wishes to use for the transaction, thereby avoiding or reducing any interchange imbalance. Embodiments provide systems and methods that allow entities to easily issue and administer proxy accounts for use in mobile payment applications while avoiding interchange imbalances that can increase the cost of administering and issuing such programs.

The components of the system as depicted in FIG. 1 are only those that are needed for processing a single transaction. Those who are skilled in the art will recognize that a practical embodiment of the system 100 may process many purchase transactions (including simultaneous transactions) and may include a considerable number of payment card issuers and their computers, a considerable number of acquirers and their computers, and numerous merchants and their POS terminals and associated proximity reader components. The system may also include a very large number of payment card account holders, who carry mobile devices and/or payment cards (including contactless payment cards and/or magnetic stripe cards).

It should also be understood that the mobile device 102 is operable as a conventional mobile telephone for communication—both voice and data—over a conventional mobile telecommunications network, which is not depicted in the drawing. Thus, the mobile device 102 is in communication in a conventional manner with a mobile network operator ("MNO"—also not shown). An over-the air communication channel 116 between the mobile device 102 and the one or more server computers 114 (or a related computer) may be established from time to time for purposes such as personalization of the payment application program in the mobile device 102 or for updates to the personalization or the like.

Aspects of the invention have been described above with reference to use of a payment-enabled mobile telephone. Alternatively, however, the principles of the invention are also applicable to other types of mobile devices that store and are at times controlled by a payment application program. For example, in some embodiments, an RFID sticker or tag may be associated with a portable communication device, where the RFID sticker or tag is writable and updatable to store proxy account information as described herein. Any and all such devices, including payment-enabled mobile telephones, should be understood as included in the term "mobile device". Further, in some embodiments, the mobile device may be a card-shaped device which is configured to dynamically select and transmit different proxy account identifiers to a POS terminal 104 based on a selection of a desired primary payment account by the cardholder. As one illustrative example, the device may be a credit-card shaped device which has a magnetic stripe emulator allowing different proxy account identifiers to be presented to a POS terminal 104 based on selection of different accounts by the cardholder.

The nonvolatile memory (NVM) referred to herein may be composed of one device or of two or more devices.

As used herein and in the appended claims, a program or device is "configurable between" two or more distinct configurations if input may be provided to the program or device to select between or among the configurations.

As used herein and in the appended claims, the term "POS terminal" includes a proximity reader component included in or connected to such a terminal.

Relative to a payment-enabled mobile device and a proximity reader, the term "tap" refers either to brief physical contact, or relative positioning such that wireless communication occurs.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

The flow charts and descriptions thereof herein should not be understood to prescribe a fixed order of performing the method steps described therein. Rather the method steps may be performed in any order that is practicable.

As used herein and in the appended claims, the term "payment card network" refers to a system for handling purchase transactions and related transactions and operated under the name of MasterCard, Visa, American Express, Diners Club, Discover Card or a similar system. In some embodiments, the term "payment card network" may be limited to systems in which member financial institutions issue payment card accounts to individuals, businesses and/or other organizations.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method for operating a mobile device to conduct a payment transaction, comprising:
presenting the mobile device at a point of sale for use in a payment transaction;
receiving, from a user of said mobile device, a selection of a primary payment account for use in said payment transaction;
automatically identifying, in said mobile device, at the point of sale, a product type of said primary payment account; and
automatically selecting, by said mobile device, at the point of sale, a proxy payment account identifier having an equivalent product type as said product type of said primary payment account and causing said proxy payment account identifier to be transmitted to said point of sale for use in said payment transaction.

2. The method of claim 1, further comprising:
causing a first payment authorization request message to be routed to an issuer of said proxy payment account, said first payment authorization request message including said proxy payment account identifier, and a purchase amount of said payment transaction, said first payment authorization request message assessed a first interchange fee at a first interchange rate.

3. The method of claim 2, further comprising:
causing a second payment authorization request message to be created by said issuer of said proxy payment account, said second payment authorization request message including information identifying a primary payment account associated with said proxy payment account, and said purchase amount of said payment transaction, said second payment authorization request message assessed an interchange fee substantially equivalent to said first interchange fee and at said first interchange rate.

4. The method of claim 1, wherein said automatically identifying a product type is performed under control of a payment application operated on said mobile device.

5. The method of claim 4, wherein said automatically selecting a proxy payment account identifier is performed under control of said payment application.

6. The method of claim 1, wherein said primary payment account is selected from among a plurality of primary payment accounts associated with said mobile device.

7. The method of claim 1, wherein said product type is one of (i) a debit product, (ii) a prepaid debit product, and (ii) a credit product.

8. The method of claim 1, wherein a product type of said proxy payment account is a prepaid debit product.

\* \* \* \* \*